United States Patent [19]
Ushimaru

[11] Patent Number: 5,642,929
[45] Date of Patent: Jul. 1, 1997

[54] LIGHTED KNOB

[75] Inventor: Hiroshi Ushimaru, Miyagi-ken, Japan

[73] Assignee: Alps Electric Co., Ltd., Tokyo, Japan

[21] Appl. No.: 655,524

[22] Filed: May 30, 1996

[30] Foreign Application Priority Data

Jun. 21, 1995 [JP] Japan .................................. 7-154744

[51] Int. Cl.⁶ .................................................. F21V 33/00
[52] U.S. Cl. .................. 362/85; 362/95; 362/80; 200/312
[58] Field of Search ..................... 362/23, 29, 30, 362/85, 80, 95, 100, 253, 234, 812; 200/310, 312, 314, 317

[56] References Cited

U.S. PATENT DOCUMENTS

| | | | |
|---|---|---|---|
| 4,987,279 | 1/1991 | Hirose et al. | 200/312 X |
| 5,434,757 | 7/1995 | Kashiwagi | 362/85 X |

*Primary Examiner*—Stephen F. Husar
*Attorney, Agent, or Firm*—Guy W. Shoup; Patrick T. Bever

[57] ABSTRACT

A lighted knob including a knob body provided with light transmission holes, and nameplates through at least a part of which the light from light sources passes. And in a part of the nameplates are formed incorrect assembly preventive light sections; and on a part of the peripheral edge of the translucent sections are formed shield sections, so that the incorrect assembly preventive light sections will not be shielded unless the specific nameplates are attached to specific translucent sections.

3 Claims, 3 Drawing Sheets

LIGHTED KNOB

BACKGROUND OF THE INVENTION

The present invention relates to a lighted knob provided with a lighted indicator which illuminates a character, symbol, or numeral at night and, more particularly to a lighted knob which illuminates to facilitate the discrimination of whether or not a nameplate for indicating control items has been properly mounted in a specific position.

Various types of equipment are provided with knobs for performing on-off operation and predetermined control operation of the equipment. As these knobs, lighted knobs have been in wide use for the ease of identification of their control purpose or on-off condition by illuminating a nameplate on the knobs in order to ensure correct knob manipulation even in the gloom and at night.

A lighted switch knob for opening and closing a slide roof of an automobile will be explained as one example of the lighted knob by referring to FIGS. 4 and 5.

FIG. 4 is a plan view showing the switch knob with the nameplate removed, and FIG. 5 is a vertical cross section, partly cut off, of the switch knob.

A lighted knob 1 to be operated to open and close a slide roof is fitted, on a body 5, with three nameplates: a control item nameplate 2 placed at the center thereof to indicate the operation of the slide roof; a first operation nameplate 3 placed beside the control item nameplate 2, for closing the roof; and a second operation nameplate 4 for opening the roof. The control item nameplate 2 has a code "ROOF" in relief indicating a control item; the first operation nameplate 3 is formed to indicate the contour of a car in relief; and the second operation nameplate 4 is formed to indicate the contour of a car in relief with the roof opened. The knob body 5 is produced from a synthetic resin and provided with three light transmission holes 6, 7 and 8 drilled in the front part and covered with the three nameplates 2, 3 and 4. On the peripheral edge of each of the light transmission holes 6, 7 and 8 is formed a step section 9 lowered at least by the thickness of the nameplates 2, 3 and 4. The peripheral edge section of the nameplates 2, 3 and 4 is bonded to the step section 9 with an adhesive. Each of the nameplates 2, 3 and 4, the details of which constitution is not illustrated, is composed of a nameplate sheet on which a transparent character, contour, etc. for example are printed, and a transparent, heat-resisting protective sheet affixed on the back side through an adhesive layer. Also, when a colored character or contour is used, filling a clear colored ink between the nameplate sheet and an adhesive layer is sufficient. Behind the knob body 5 are arranged light sources 11, 12 and 13 for illuminating the nameplates 2, 3 and 4 respectively. A projecting wall 14 provided on the back side of the knob body 5 serves to shield the light from an adjacent light source.

Since most nameplates have a symmetrical shape such as rectangular and square as illustrated, incorrect assembling is very likely to occur by securing the nameplates 2, 3 and 4 upside down to the light transmission holes 6, 7 and 8 respectively at the time of lighted knob assembling. Furthermore, in the above-described lighted knob 1, the first and second operation nameplates 3 and 4 are of the same size and therefore there will also occur an error in assembling the knob in which the second operation nameplate 4 is secured to the light hole 7 for the first operation nameplate 3.

In order to prevent such an incorrect assembling, there are adopted nameplate sheets of different shapes, and the knob body is provided with a receiving section which conforms to these shapes, and also is provided with a recess. At the same time the nameplate is provided with a projection, which fits in the recess. However, if various many types of nameplate sheets are prepared, many kinds of dies also will be needed correspondingly, resulting in an increased cost and complicated parts control.

SUMMARY OF THE INVENTION

It is therefore a first object of the present invention to provide a lighted knob by which an operator can see the presence of a specific indicating member in a knob case simply by checking whether or not the incorrect assembly preventive light is lit, thereby preventing incorrect assembling by the use of a simple constitution; and also it is possible to commonly use a plurality of nameplates when needed, thus enabling to reduce the number of components, lower a production cost, and further to decrease the cost of dies.

It is a second object of the present invention to provide a low-cost lighted knob of very simple constitution which requires no member for shielding the incorrect assembly preventive light section.

It is a third object of the present invention to provide a lighted knob of such a design that a specific indicating member, if not mounted in a specific translucent section, will not be shielded, so that the operator can see at a glance whether or not the specific indicating member is properly mounted, and also can prevent incorrect assembling such as affixing the indicating member upside down.

The first object is accomplished by the use of a first means comprising a knob case having at least one translucent section, an indicating member at least one part of which to be mounted to the translucent section indicates a knob purpose by light transmission, a light source for illuminating the indicating member from the translucent section, an incorrect assembly preventive light section formed in the indicating member, and a shield section formed on the knob case to shield the incorrect assembly preventive light section when the indicating member is properly mounted to the translucent section of the knob case.

The second object is accomplished by the use of a second means comprising a knob case having at least one translucent section, an indicating member at least one part of which to be mounted to the translucent section indicates a knob purpose by light transmission, a light source for illuminating the indicating member from the translucent section, an incorrect assembly preventive light section formed in the indicating member, and a shield section formed on the peripheral edge of the translucent section, and by mounting the indicating member in such a position that the incorrect assembly preventive light section will correspond to the shield section.

The third object is accomplished by the use of a third means which has, in the second means, a plurality of translucent sections in the knob case, in which the shield sections of the light transmission sections are formed in different positions.

In the first means stated above, the incorrect assembly preventive light section is shielded when the indicating member is properly mounted to cover the translucent section of the knob case; therefore simply by checking to see if the incorrect assembly preventive light section is lit, it is possible to see that the specific indicating member is mounted on the knob case and accordingly to thereby prevent incorrect assembling and to commonly use a plurality of nameplates when needed, resulting in a decreased number of components, reduced cost, and lowered cost of dies.

In the second means, since the shield section for shielding the incorrect assembly preventive light section is mounted in a part of the translucent section, it is unnecessary to mount a separate shield member for shielding the incorrect assembly preventive light section and therefore a low-cost lighted knob is suppliable. When a plurality of translucent sections are provided, the shield sections are provided in different positions; and therefore no shielding is effected unless the specific indicating member is mounted in the specific translucent section, enabling the operator to see whether or not the indicating member is properly mounted. That is, the operator can prevent such incorrect assembling as affixing the indicating member upside down.

BRIEF DESCRIPTION OF THE DRAWINGS

All the foregoing and still further objects and advantages of this invention will become apparent from a study of the following specification, taken in connection with the accompanying drawings, wherein.

DESCRIPTION OF THE PREFERRED EMBODIMENTS

Hereinafter one embodiment of a lighted knob according to the present invention will be explained with reference to the accompanying drawings.

Figure 1:
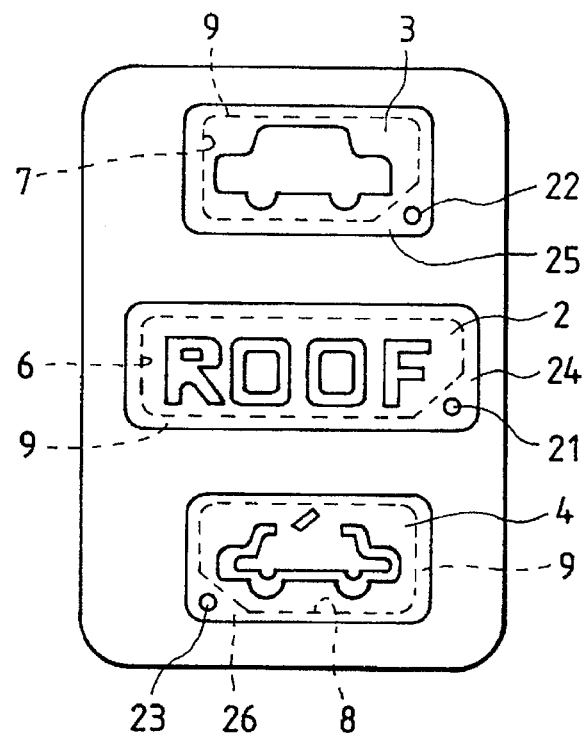
FIG. 1 is a plan view showing the mounted condition of a nameplate of one embodiment according to the present invention.
Figure 2:
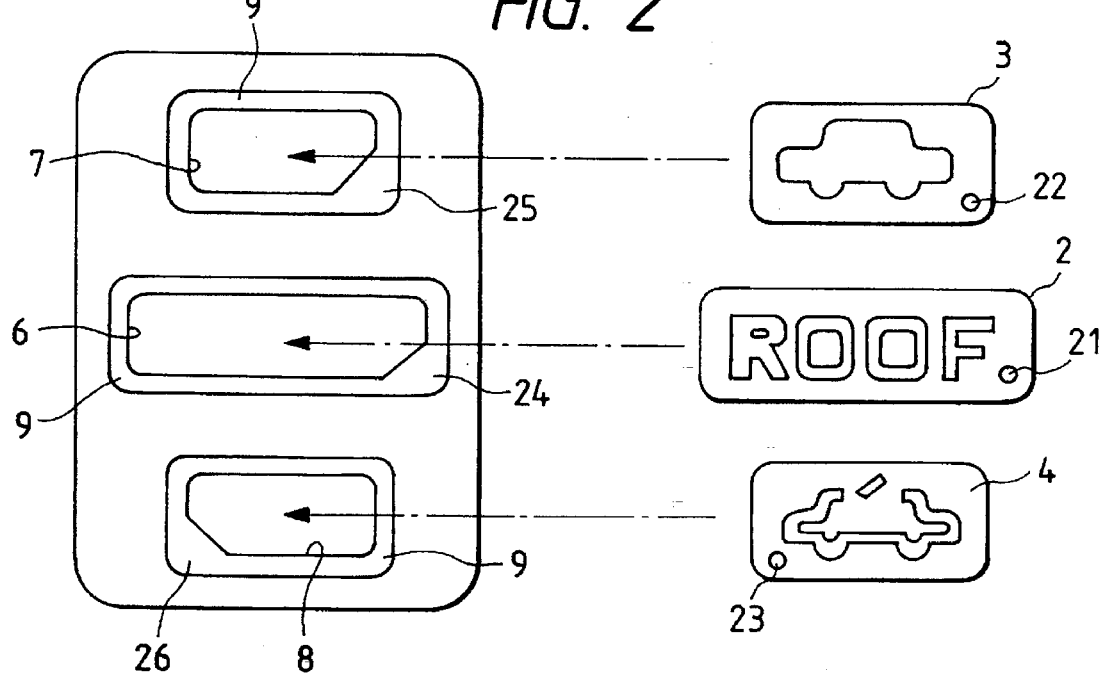
FIG. 2 is a plan view showing one embodiment of a lighted knob according to the present invention with each nameplate off.
Figure 3A:
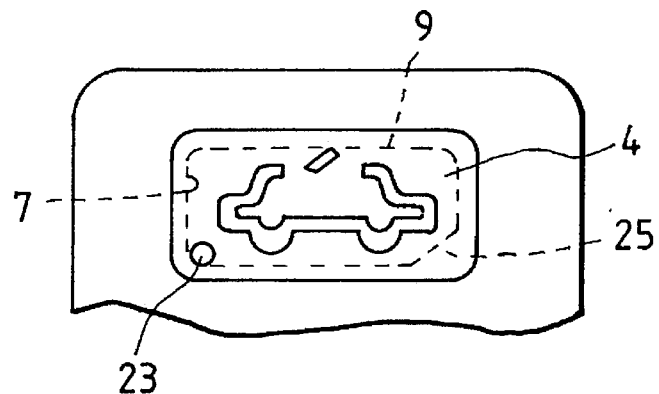
FIGS. 3A, 3B and 3C are explatory views showing incorrectly assembled lighted knobs.
Figure 3B:
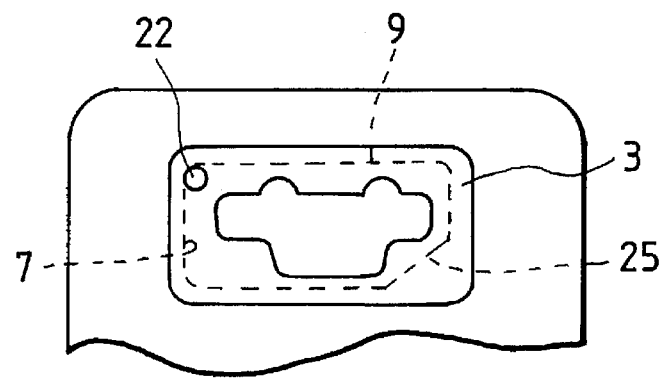
Figure 3C:
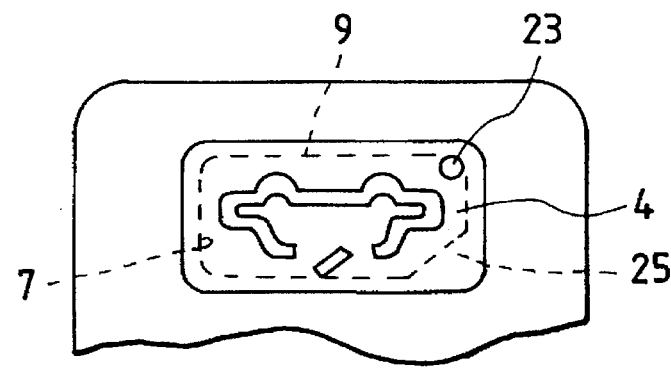
Figure 4:
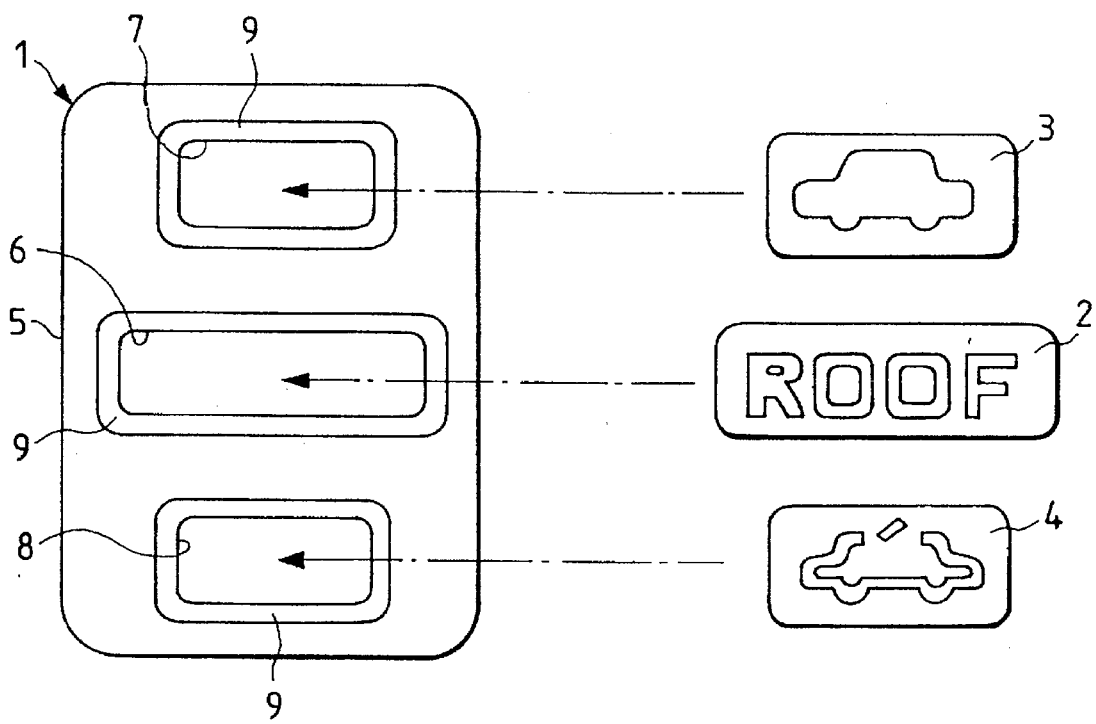
FIG. 4 is a plan view showing one example of a conventional lighted knob with each nameplate off.

FIG. 1 is a plan view showing the mounted condition of a nameplate of one embodiment of the present invention; FIG. 2 is a plan view showing a nameplate of the embodiment prior to mounting to a knob body; and FIGS. 3A, 3B and 3C are explanatory views showing incorrectly assembled condition of nameplates. Components of the substantially same constitution as those of the above-described conventional example are designated by the same reference numerals and therefore will not be explained to prevent redundancy.

Figure 5:
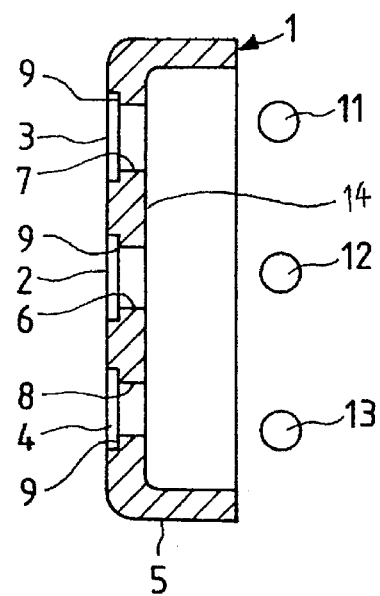
FIG. 5 is a longitudinal cross section, partly cut off, of said conventional lighted knob.

In the present embodiment also, an example of a knob for opening and closing an automobile slide roof is described similarly to the above-described conventional example. The knob body 5 of the lighted knob 1 has three light transmission holes 6, 7 and 8 to which the control item nameplate 2, the first operation nameplate 3 and the second operation nameplate 4 are mounted. On the peripheral edge of each of the light transmission holes 6, 7 and 8 is formed the step section 9. Behind the knob body 5 are arranged unillustrated light sources 11, 12 and 13 for illuminating the nameplates 2, 3 and 4 respectively as shown in FIG. 5 of the above-described conventional example, in such positions that the light from an adjacent light source will be intercepted by the projecting wall 14.

In a part of the nameplates 2, 3 and 4 are a hole-like incorrect assembly preventive light section 21, 22 and 23. Of these the light sections in the first operation nameplate 3 and the second operation nameplate 4 have the same shape. To prevent incorrect assembling of these nameplates, therefore, the incorrect assembly preventive light sections 22 and 23 are formed in different positions. When the nameplates 2, 3 and 4 are mounted to the specific light transmission holes 6, 7 and 8, shield sections 24, 25 and 26 which protrude toward the center are formed, in a part of the peripheral edge of the light transmission holes 6, 7 and 8, to intercept the light from the light sources 11, 12 and 13 correspondingly to the incorrect assembly preventive light sections 21, 22 and 23. The shield sections 24, 25 and 26 are positioned on the same plane as the step section 9.

Therefore, when the nameplates 2, 3 and 4 are properly mounted on the light transmission holes 6, 7 and 8 respectively, the incorrect assembly preventive light section 21 of the nameplate 2 is closed by the shield section 24, the incorrect assembly preventive light section 22 of the nameplate 3 by the shield section 25, and the incorrect assembly preventive light section 22 of the nameplate 4 by the shield section 25 as shown in FIG. 1. These incorrect assembly preventive light sections 21, 22 and 23, therefore, will not illuminate. However, if the nameplates 2, 3 and 4 are attached upside down on the specific light transmission holes 6, 7 and 8, the incorrect assembly preventive light sections 21, 22 and 23 of the nameplates 2, 3 and 4 will not be closed by the shield sections 24, 25 and 26 as shown in FIGS. 3B and 3C. That is, since the incorrect assembly preventive light sections 21, 22 and 23 illuminate, the nameplates 2, 3 and 4 thus attached upside down can easily be found.

Also, the incorrect assembly preventive light sections 22 and 23 of the first operation nameplate 3 and the second operation nameplate 4 are formed to be mounted in different positions; and the positions of the shield sections 25 and 26 also differ. Therefore, when the first operation nameplate 3 is mounted, if properly, to the light transmission hole 8 or the second operation nameplate 4 to the light transmission hole 7 as shown in FIG. 3A, the incorrect assembly preventive light sections 22 and 23 of the nameplates 3 and 4 will illuminate without being closed by the shield sections 25 and 26. The operator, therefore, can easily see the nameplates 3 and 4 have been improperly mounted to the light transmission holes 7 and 8. The nameplates of the same shape and dimensions can be attached in position.

In the present embodiment, the incorrect assembly preventive light sections 21, 22 and 23 and the shield sections 24, 25 and 26 are formed at the corner section of the nameplates 2, 3 and 4 and the light transmission holes 6, 7 and 8 but may be provided in other places. The incorrect assembly preventive light sections 21, 22 and 23 may be formed by drilling and also transparent holes may be formed by printing similarly to transparent characters, contour, etc. of the nameplates.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A lighted knob, comprising: a knob case having at least one translucent section; an indicating member which indicates a code by light transmission at least at a part attached in said translucent section; a light source for illuminating said indicating member from said translucent section; an incorrect assembly preventive light section formed in said indicating member; and a shield section which is formed on said knob case, and shields said incorrect assembly preventive light section when said indicating member is properly attached to said light translucent section of said case.

2. A lighted knob, comprising: a knob case having at least one translucent section; an indicating member which indicates a code by light transmission at least at a part attached in said translucent section; a light source for illuminating said indicating member from said translucent section; an incorrect assembly preventive light section formed in said indicating member; a shield section formed on the peripheral edge of said translucent section; and said indicating member mounted so that said incorrect assembly preventive light section and said shield section will be aligned.

3. A lighted knob according to claim 2, wherein said knob case has a plurality of said translucent sections, and said shield sections of said translucent sections are formed in different positions.

* * * * *